UNITED STATES PATENT OFFICE.

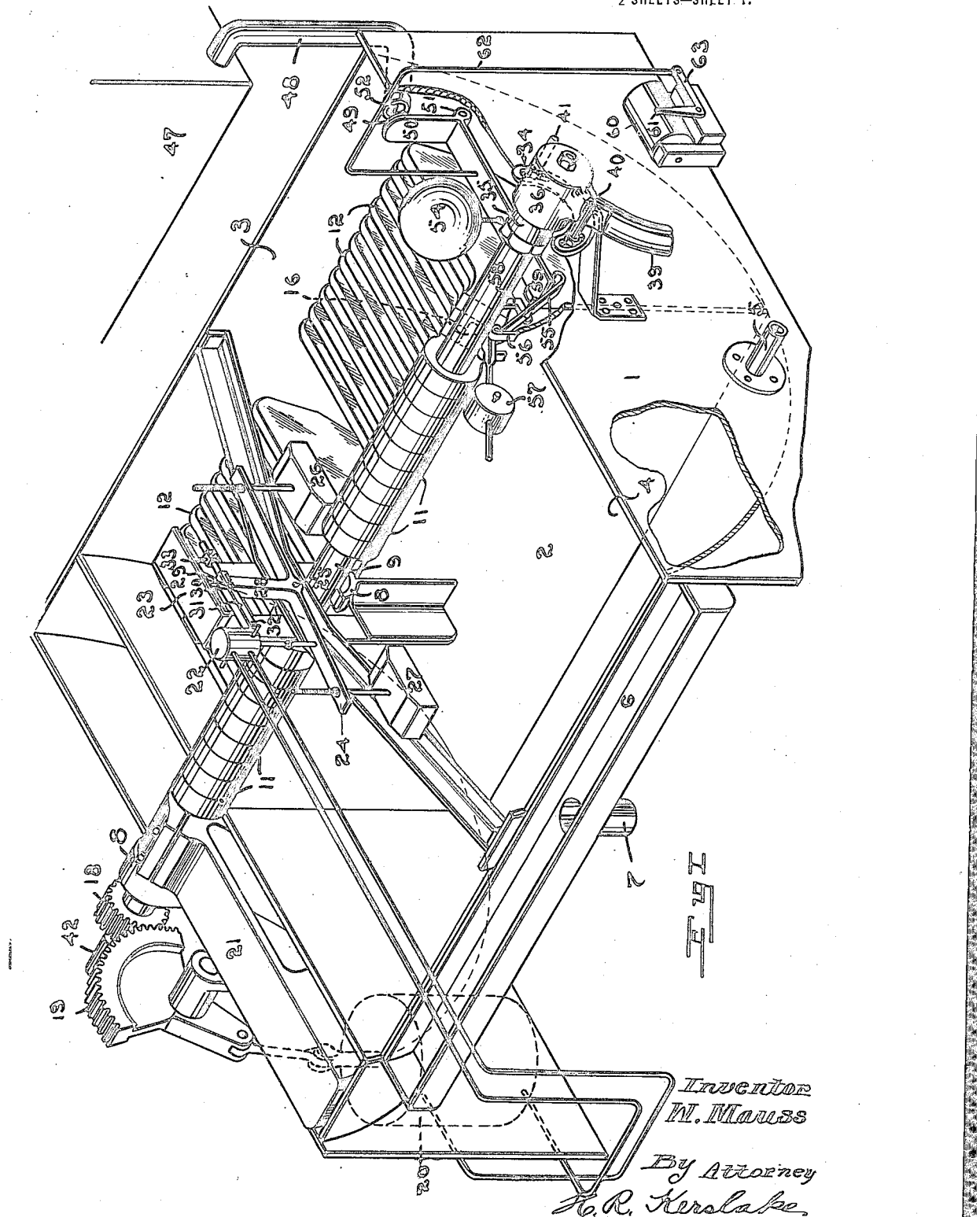

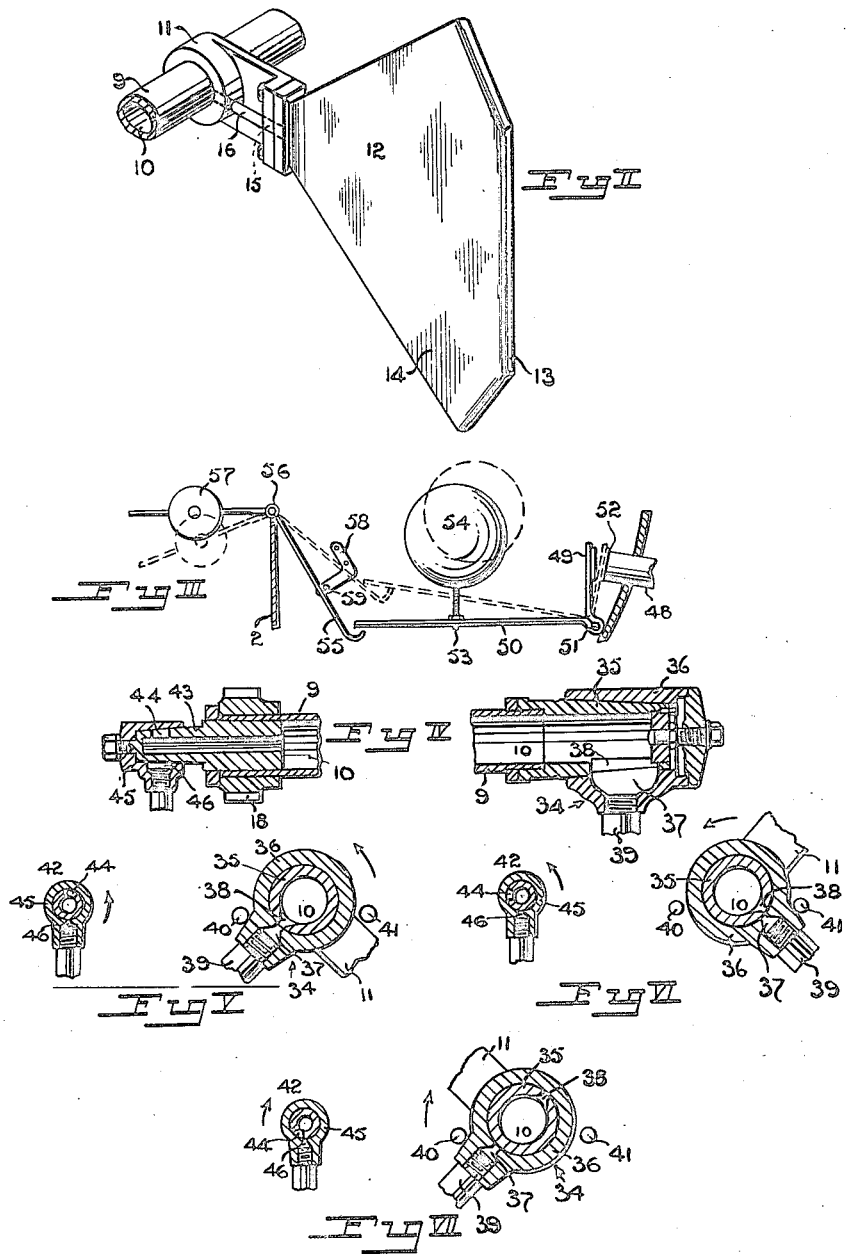

WILHELM MAUSS, OF JOHANNESBURG, TRANSVAAL, SOUTH AFRICA, ASSIGNOR TO CONTINUOUS CENTRIFUGALS LIMITED, OF JOHANNESBURG, TRANSVAAL, SOUTH AFRICA.

VACUUM FILTER.

1,419,286.  Specification of Letters Patent.  Patented June 13, 1922.

Application filed September 3, 1920. Serial No. 408,111.

*To all whom it may concern:*

Be it known that WILHELM MAUSS, a British subject, residing at Cullinan Buildings, corner Main and Simmonds Streets, Johannesburg, Transvaal Province, Union of South Africa, has invented certain new and useful Improvements in Vacuum Filters, of which the following is a specification.

The present invention relates to filters of the vacuum type in which the whole area of the filter medium is submerged during the filtering operation.

In the operation of a vacuum filter, especially when treating liquid such as sugar juice containing colloid which has a considerable clogging effect on the filter medium, the filtering capacity of the apparatus progressively diminishes until conditions are reached when it is no longer economically desirable to operate the filter. The filtering operation should then be stopped and the filter medium be cleaned. In treating sugar juice it is especially desirable that the entire cleaning operation, including filtration, should be conducted as rapidly as possible in order to avoid loss of crystallizable sugar.

An object of the present invention is to construct a filter which automatically stops the filtering operation when the filtering capacity has fallen to a predetermined degree, thereby ensuring that the operation is always conducted within the limiting economic conditions, notwithstanding variation in the constitution of the sugar juice or other material under treatment.

A vacuum filter constructed according to the present invention is illustrated in the accompanying drawings in which—

Fig. I is a general view of the filter.

Fig. II shows a filter leaf.

Fig. III illustrates the juice feed valve mechanism.

Fig. IV is a longitudinal section of the ends of the hollow shaft.

Fig. V shows in cross sections, the two valves of Fig. IV when the filter leaves are in the juice tank.

Fig. VI is a similar view when the leaves are passing from the juice tank to the wash tank.

Fig. VII is a similar view when the leaves are returning to the juice tank.

The material which the present construction is designed especially to treat is sugar juice, which, in accordance with the process described in my application filed herewith, has been centrifuged in the raw state for the separation of mechanical impurities, then prepared to flocculate the remaining albuminous matter, and which is to be subject to vacuum filtration in order to remove the flocculated albuminous matter.

1 indicates a container of semi-cylindrical form divided by a partition 2 into a tank 3 for sugar juice or other filtrant, and a tank 4 for wash water. Water is supplied to the latter by a pipe 5, and at the side of said tank is an over-flow trough 6 fitted with a waste pipe 7. Mounted in bearings 8 over the tank is an oscillating shaft 9 formed with an axial bore 10. Attached to the shaft 9 is a number of filter heads 11 to each of which is detachably bolted a filter leaf 12. Each filter leaf consists of a frame 13 enclosed by a filter cloth 14.

A passage 15 affords communication between the interior of the leaf and the bore 10 of the shaft, and includes an inspection section formed of a glass tube 16.

In the operation of the filter the shaft 9 is oscillated to move the leaves alternately between the tanks 3 and 4. For this purpose a pinion 18 fast on the shaft 9 is engaged by a quadrant 19 which is moved back and forth by a motor 20. The weight of the leaves 12 is counterbalanced by a weighted arm 21 fast on the shaft 9.

The distribution of actuating fluid to the motor 20 is controlled by a valve 22 carried on a frame 23 fixed above the container 1. Said valve is moved alternately up and down to cause opposite movements of the motor 20, and for this purpose it is attached to a rocking lever 24 pivoted at 25 to the frame 23. To the ends of such lever are adjustably attached the floats 26 and 27 which are moved by rising of the liquid in the tanks 3 and 4 respectively. A sudden release device for the lever 24 consists of an upright arm 28 rigid with said lever and pointed at the end to engage either of two notches 29, 30, in a latch 31 pivoted at 32, and weighted at 33. The arrangement is such that, when either float 26 or 27 is down, it is so held until its buoyancy has increased to such an extent as to release the arm 28 from the notch 29 or 30 in which it is engaged, when the float throws over the lever 24 suddenly. The arm 28 then engages the other of the notches 29, 30, to hold the other float down in the same way.

The interior of the shaft 9 and thereby also the leaves 12, are exhausted through means of a valve 34 mounted at one end of the shaft 9 and actuated by the oscillation of said shaft to open and cut off communication according to the position of the leaves. Said valve comprises a plug 35 fixed coaxially to the shaft, and a body 36 relatively rotatable on said plug. A port 37 in the body opens to a port 38 in the plug, or is closed therefrom according to the relative angular positions of the plug and body. In order that the body may itself rotate to some extent, it is connected to the suction means by a flexible hose 39. Rotational movement of the plug relatively to fixed parts is limited by adjustable stops 40, 41.

Steam or other pressure fluid for detaching the film or deposit from the leaves is supplied under the control of a somewhat similar valve 42 comprising a plug 43 fixed to the shaft 9 and having a port 44, and a body 45 formed with a port 46, the body in this case however, being stationary.

The juice is supplied to the tank 3 from a steady head 47. Since it is important for the success of the treatment process, for which the present apparatus is especially designed, that the prepared juice should be agitated as little as possible, the pipe 48 by which the juice passes to the tank 3 is of large diameter and shaped with easy curves.

The inflow of juice to the tank 3 is controlled by a valve 49 mounted on an arm 50 pivoted at 51 and closing against a seating 52 at the end of the pipe 48. On an arm 53 rigid with the arm 50, is an adjustable float 54, by the rise of which the valve 49 is gradually closed. Co-operating with the end of said arm 53 is a lever 55, pivoted to the partition 2 at 56, and having a counter-weight 57 which tends to raise said arm 53 and thereby close the valve 49. On the adjacent filter head 12 is a bracket 58 fitted with a projecting pin 59 which, when the filter leaves are immersed in the juice tank 3, depresses the unweighted end of the lever 55 and holds the same clear of the arm 53.

A device for recording the operation of the filter consists of a clock-driven drum 60, on which a trace is made by a pencil 61 actuated in accordance with the movement of the float arm 53, through the rod 62 and bell crank 63.

The operation is as follows:—

The leaves 12 being in the sugar tank 3, the lever 55 is depressed and the valve 49 is free to be controlled by its float 54. The parts of the vacuum valve 34 are positioned as indicated in Fig. V, thus placing the leaves under vacuum. The steam valve 42 is closed as indicated in the same figure.

When the valve 49 is fully open it permits juice to flow to the tank 3 at a rate about equal to the filtering capacity of the clean leaves, the purified juice passing into the leaves and the colloid matter being deposited on the exterior thereof. As the deposit increases, the rate of flow through the leaves decreases, and the level of juice in tank 3 gradually rises. The float 54 rises with the juice and moves valve 49 to diminish the inflow of fresh juice according to the decreased flow through the leaves. The float 26 tends to rise with the juice, but is restrained by the pointed arm 28 engaging the notch 30, until its increasing buoyancy displaces the latch lever 31, and suddenly throws over the rocking lever 24. The float 26 is so set as to throw over the lever 24 in this manner when the flow of juice has been reduced to the economic limit.

The valve 22 is thereby moved to cause the motor to rotate the shaft 9 so that the leaves are lifted out of the tank 3 and swung over into the wash tank 4.

Upon the leaves being removed from the juice tank 3, the lever 55 is relieved of the restraint of the pin 59. Under the influence of its weight 57 it tilts the arm 53 to close entirely—as indicated by the dotted lines Fig. III—the valve 49, so preventing the ingress of sugar juice, which, were it allowed to enter, would overflow on the return of the leaves to the tank 3.

During the initial movement of the shaft 9, the vacuum valve body 36 moves with its plug 35, so that vacuum is maintained within the leaves and the residual juice is extracted from the deposit on them. When the leaves have come to a position above the wash tank 4, the vacuum valve body 36 is stopped by the stop 41 (Fig. VI), and the onward movement of the plug 35 with the shaft 9 shuts off the vacuum. Thereafter the steam valve 42 opens to admit steam to the interior of the leaves to detach or loosen the deposit from the surface thereof. At the completion of the shaft's movement, the leaves are plunged into the wash water in tank 4, whereby the deposit is washed away from the leaves.

When the leaves have become immersed in the wash tank the movement of the shaft 9 is reversed to restore them to the juice tank. Such reverse movement is effected similarly to the initial movement, but so that the dwell of the leaves in the wash tank 4 is momentary. For this purpose, the wash tank is constantly supplied with water through the pipe 5 in such quantity that the immersion of the leaves therein causes the water to overflow to the trough 6. This ensures periodical removal of the wash water carrying deposit from previous cycles, and also causes the float 27 to rise at once with sufficient buoyancy to displace the arm 28 from the notch 29, and rock the lever 24 to reset the valve 22. The motor 20 is thereby operated to lift the leaves out of the wash tank 4 and return them to the juice tank 3.

During the return movement of the leaves the steam valve 42 is shut off at the same point at which it opened. In the case of the vacuum valve 34, the body 36 moves initially with the plug 35, until it is arrested by the stop 40. The plug then travels on a further distance before bringing the ports 37 and 38 together, so that the vacuous condition of the leaves is not restored until they are immersed in the juice, and the drawing of air through them, is prevented.

It will be seen that the filter can be left to carry out its cycles of filtering and cleansing without personal control, so long as juice is supplied to it. The trace made by the pencil 61 on the drum 60 records, for each cycle, the time during which the valve 49 gradually closes; when it closes fully on the withdrawal of the leaves from the juice tank; and when it opens on their return. Any variations of the feed thus shown to be necessary are made by adjusting the float 54 towards or from its arm 53; or, as the case may be, the float 26 towards or from the rocking lever 24. An abnormal frequency of the cycles would usually indicate faulty preparation of the incoming juice, enabling the same to be corrected.

Inspection of the sight glasses 16 shows at what stage the leaves become sufficiently dried, the stop 41 being adjusted to shut off the vacuum at that point in the movement.

I claim:—

1. In filtering apparatus, a filter medium, and means causing the operation of a cycle including filtration and medium cleansing steps, said means controlling the cycle according to the permeability of the medium.

2. In filtering apparatus, a filter medium, means to immerse the same alternately in filtrant and washing liquid, said means being caused to operate by a rise of level of the filtrant.

3. In filtering apparatus, filter leaves, a filtrant tank, means to feed filtrant to said tank, means for removing the leaves from the filtrant tank and cleansing them when so removed, said last named means being controlled by a rise of level of the filtrant in its tank.

4. In filtering apparatus, filter leaves, a filtrant tank, means to feed filtrant to said tank, means for removing the leaves from the filtrant tank and cleansing them when so removed, said last named means being controlled by rise of level of the filtrant in its tank, and means to shut off the supply of filtrant to the filtrant tank whilst the leaves are removed therefrom.

5. In filtering apparatus, filter leaves, a filtrant tank, a float operated feed valve operating to diminish the supply of filtrant to the tank as the level of the filtrant therein rises, means for removing the leaves from the filtrant tank and cleansing them when so removed, said last named means being controlled by a rise of level of the filtrant in its tank, and means operating to close the feed valve when the leaves are removed.

6. In filtering apparatus, filter leaves, a filtrant tank, mechanism for removing the leaves from said tank and cleansing them when so removed, means to feed filtrant to said tank whilst the leaves are in it and to stop the feed whilst the leaves are removed, a float tending to rise with the level of the filtrant in the tank, and restraining means for the float adapted to free the same suddenly, said float controlling the leaf removing mechanism.

7. In filtering apparatus, filter leaves, a filtrant tank, mechanism for removing the leaves from said tank and cleansing them when so removed, means to feed filtrant under constant head to said tank, a valve controlling the inflow of filtrant to the tank, and means rendered operative by the removal of the leaves to close said valve.

8. In filtering apparatus, filter leaves, a filtrant tank, a wash tank, mechanism to transfer the leaves alternately from one tank to another, said mechanism determining the period of immersion in the filtrant tank according to the permeability of the leaves, and effecting momentary immersion in the wash tank.

9. In filtering apparatus, a filtrant tank, a wash tank, an oscillatable hollow shaft, filter leaves secured to said shaft to be immersed by the oscillation thereof alternately in the filtrant tank and the wash tank, and internally communicating with the bore of the shaft, a vacuum control valve comprising a part fast with the shaft, and a part rotatable relatively to the first part having an oscillating movement less than that of the shaft, said parts being formed with cooperating ports whereby vacuum is maintained for a greater portion of the movement from the filtrant tank to the wash tank than of the reverse movement.

In testimony whereof I affix my signature.

WILHELM MAUSS,